US010713897B2

(12) United States Patent
Severance (10) Patent No.: US 10,713,897 B2
(45) Date of Patent: Jul. 14, 2020

(54) TRADING-THEMED GAME

(71) Applicant: Scott Severance, Chicago, IL (US)

(72) Inventor: Scott Severance, Chicago, IL (US)

( * ) Notice: Subject to any disclaimer, the term of this patent is extended or adjusted under 35 U.S.C. 154(b) by 1085 days.

(21) Appl. No.: 14/435,159

(22) PCT Filed: Oct. 19, 2012

(86) PCT No.: PCT/US2012/061087
§ 371 (c)(1),
(2) Date: Apr. 11, 2015

(87) PCT Pub. No.: WO2013/059639
PCT Pub. Date: Apr. 25, 2013

(65) Prior Publication Data
US 2015/0269813 A1  Sep. 24, 2015

(51) Int. Cl.
*A63F 13/00* (2014.01)
*G07F 17/32* (2006.01)
*G06Q 40/04* (2012.01)

(52) U.S. Cl.
CPC ......... *G07F 17/3288* (2013.01); *G06Q 40/04* (2013.01); *G07F 17/3244* (2013.01)

(58) Field of Classification Search
CPC ...... G06Q 40/04; G06Q 40/06; G06Q 40/087; G06Q 40/00; G06Q 40/08
See application file for complete search history.

(56) References Cited

U.S. PATENT DOCUMENTS

| | | | | |
|---|---|---|---|---|
| 2007/0087820 | A1* | 4/2007 | Van Luchene | G07F 17/32 463/25 |
| 2008/0027880 | A1* | 1/2008 | Yu | A63F 13/10 705/36 R |
| 2010/0102509 | A1* | 4/2010 | Pickelhaupt | A63F 3/00069 273/278 |

* cited by examiner

*Primary Examiner* — David L Lewis
*Assistant Examiner* — Eric M Thomas (57) ABSTRACT

Trading-themed games are disclosed. An electronic trading-themed video gaming system includes a game controller in electronic communication with a network that provides for data communication between the game controller and one or more game clients. The game controller includes logic to communicate with the one or more game clients via the network and logic to receive inputs from and send outputs to the one or more game clients for the purpose of playing an online game. The online game is a finance-based, trading-themed game having a player interface where, as part of playing the game, a player can selectively trade a real-world trading object in the real world or trade the real-world trading object in a virtual trading marketplace within the virtual world of the game.

20 Claims, 4 Drawing Sheets

TRADING-THEMED GAME

CROSS REFERENCE TO RELATED APPLICATIONS

This application claims priority to and the benefit of U.S. Provisional Patent Application No. 61/627,862, filed on Oct. 19, 2011, the entire contents of which are incorporated herein by reference in their entirety.

TECHNICAL FIELD

This disclosure relates to systems and methods for a computer-implemented, interactive game, which may be implemented on various platforms, that is both entertaining and instructive with respect to trading, and in particular, securities and other financial product trading. Games as described herein can be associated with real-world trading activities in related business methods.

BACKGROUND

Games can offer a source of entertainment and, in some cases, educational benefits. For example, some games allow players to act out real-world circumstances in a game setting where risk is minimal, hypothetical, or fictitious. One exemplary game of this type is sold under the Monopoly brand by Hasbro, Inc., Pawtucket, R.I., USA. In this popular game, players can buy fictitious properties using pretend currency in a board game setting. Players can achieve simulated "wealth" by accumulating properties and charging other players who land on those properties during game play. Such a game presents the possibility of teaching players several real-world principles of finance, including, for example, the principle of risk versus reward, property assessment and valuation, wealth growth and accumulation, and other principles. Even though the game can be played with little or no actual consequence to the players, the game can teach principles that can be applied to real-world situations.

Games can be implemented on different platforms. Some games, like the one described above, can be played as a so-called "board" game where players gather around a playing surface and interact with physical objects. For example, pretend money can be exchanged to buy and sell property, and iconic game pieces can be moved about the board to indicate ownership of a property by a player.

In another example, some games can be implemented on computer systems that allow players to interact from remote locations while the game is played. For example, a computer-implemented version of the above-referenced game can be played by players using various types of computing systems, e.g., desktop or laptop computers, so-called "smart phones," personal computing devices, or tablets.

SUMMARY

In one exemplary aspect, an electronic trading-themed video gaming system is provided. The electronic trading-themed video gaming system includes a game controller in electronic communication with a network that provides for data communication between the game controller and one or more game clients, wherein the game controller comprises logic to communicate with the one or more game clients via the network and logic to receive inputs from and send outputs to the one or more game clients for the purpose of playing an online game. The online game is a finance-based, trading-themed game having a player interface where, as part of playing the game, a player can selectively trade a real-world trading object in the real world or trade the real-world trading object in a virtual trading marketplace within the virtual world.

In one embodiment, the game controller is capable of receiving game-play input from a first game client, executing functions to advance game play specific to the first game client according to game logic, and publishing game content to the first game client.

In one embodiment, the virtual world within the online game provides opportunity for the character to participate in one or more educational experiences that teach the player selected financial aspects or how to use the player interface to trade one or more of the trading objects, or both. In a related embodiment, the trading object is a product listed on a public or private exchange. In a related embodiment, the trading object is a stock, bond, commodity, index, future, option, derivative, micro-product, hedge- or exchange-traded fund or mutual fund.

In one embodiment, the online game further includes a plurality of playing levels. Within the plurality of playing levels, a first playing level having a first degree of difficulty and a second playing level different from the first playing level having a second level of difficulty different from the first level of difficulty. A first criterion must be met in order for the character to be played at the first level, and a second criterion must be met in order for the character to be played at the second level. In a related embodiment, the first playing level and the second playing level are displayed on the one or more game clients as a virtual trading pit. In a related embodiment, the criterion includes successfully completing at least one of the educational experiences. In a related embodiment, the criterion includes accruing a selected threshold number of points earned through profitable trades of the trading objects within the virtual trading marketplace or accomplishing learning objectives defined in game logic.

In one embodiment, the system further includes logic for communicating a market trade defined by the player to a brokerage from the interface, receiving a communication from the brokerage in response to executing the market trade, and integrating a result of the market trade into game-play of the game.

In one embodiment, the game controller is capable of receiving market data from one or more market data providers. In a related embodiment, the game controller is capable of using live market data for game play or storing market data for use in simulated virtual trading sessions.

In one embodiment, the system further includes logic for publishing trading activity of a first game client to a second game client, wherein the trading activity is trading activity on the virtual marketplace.

In one embodiment, the game client is a personal computer, laptop computer, smartphone, tablet, cellular phone, gaming device or console, or module of an electronic social media platform.

In another exemplary aspect, a computer-implemented game is provided. The game includes a game environment provided by a virtual world controlled by computer logic, which itself includes one or more player-controllable characters, a training environment within the virtual world where the character is capable of achieving credit for acquiring financial trading skills taught within the training environment, and a plurality of ordered playing levels in which the character can be engendered by a player to perform a trading activity in a virtual marketplace. Each of the playing levels has a different degree of difficulty in profit-making from the trading activity, and the character must meet criteria to move from a first playing level to a second playing level. A highest-skill level provides the capability for the player to execute real-world marketplace trading activity from within the game environment.

In one embodiment, the one or more player-controllable characters compete with each other in virtual-world or real-world trading competitions or tournaments.

In one embodiment, the training environment is a virtual classroom or virtual space where a game character having knowledge of trading markets mentors the character.

In one embodiment, the playing levels are represented by virtual trading pits comprising characters of other players engaged in the game.

In one embodiment, a first character of the one or more characters is capable of receiving market-related information from a repository of market data or a second character of the one or more characters.

In yet another exemplary aspect, a system for generating revenue is disclosed. The system includes a live-hosted multiplayer online gaming system. The online gaming system includes a game controller in electronic communication with a network that provides for data communication between the game controller and a plurality of game clients. The game controller includes logic to communicate with one or more of the plurality of game clients via the network and logic to receive inputs from and send outputs to the one or more game clients for the purpose of playing an online game. The online game is a finance-based, trading-themed game having a player interface where, as part of playing the game, a player can selectively trade a real-world trading object in the real world or trade the real-world trading object in a virtual marketplace within the virtual world. A provider of the live-hosted multiplayer online gaming system is a shareholder in the real-world trading object.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

DESCRIPTION OF DRAWINGS

The present embodiments are illustrated by way of the figures of the accompanying drawings in which like references indicate similar elements, and in which.

DETAILED DESCRIPTION OF ILLUSTRATIVE EMBODIMENTS

In one exemplary aspect, trading-themed, electronic games are provided. In particular, computer-implemented, trading-themed games are provided that can entertain, educate, and provide real-world financial gain to the game player(s) and, in certain embodiments, to the game providers. For the benefit of the reader, this disclosure is provided in three parts. The first part describes game embodiments from a conceptual viewpoint, e.g., educational benefits of the game, how the game is played, how players interact with each other, and the like. The second part describes implementation and enablement of various game embodiments, e.g., within a computer or computer network architecture. The third part illustrates exemplary interface elements, e.g., screen snapshots and the like that can incorporated in to a trading-themed game according to various embodiments. In general, the trading-themed games described herein, including alternatives and variations thereof, can be played on any suitable computing device such as a smartphone, tablet, personal computer, video game console, or other computing device.

Conceptual Elements of Exemplary Trading-Themed Games

In one exemplary aspect, a computer-implemented, trading-themed game is provided which can entertain, educate, and provide real-world financial gain to players and, in certain embodiments, to one or more providers of the game. A game provider can be, e.g., a company involved in serving the game to players, maintaining game systems, hosting the game, providing support, etc. Through game-play, the player can learn trading and other financial skills which can be transferable to executing real-world trading strategies and lead to real-world income.

As an exemplary overview, a trading-themed game can be a game, e.g., a video game in which a game player (hereinafter simply "player") controls their character in a virtual world controlled by programming logic as described in greater detail herein. The virtual world can include any desired aspect reflective of the real world, for example, physical objects, landscapes, buildings, other people (represented as other players' characters), trading pits, banks, exchanges, and the like. The virtual world can also include fantasy elements and aspects that enhance game play. Examples of fantasy elements and aspects include, but are not limited to mythological or fantasy characters such as wizards; the ability for the character to break laws of physics that exist in the real world, such as being able to fly, time travel, teletransport, and perform other feats that one would not normally be able to accomplish in the real world.

In one embodiment, the player can control their character's existence in the virtual world as they aspire to become masterful in financial trading matters and achieve top-rank in a system of skill levels (referred to as "pit levels") ranging from, e.g., beginner to expert. As used herein "trading" can refer to the act of buying, selling, and otherwise managing financial trading objects such as stocks, bonds, futures, currencies, and the like as one skilled in the art will appreciate.

In one embodiment, a player can achieve top-rank status by completing various requirements defined within the game logic. For example, to move from one skill level to the next, higher skill level, a player's character may be required to attend educational sessions within the virtual world, e.g., within the game environment, which are taught by master-level traders or fantasy characters possessing in-depth knowledge of financial matters and, in particular, trading. A player's character may additionally be required to amass a pre-determined number of points in the game to move to the next level. As described in greater detail below, game points can be amassed in the virtual world, for example, by engaging in virtual trading and earning "money" from those trades, similar to how one in the real world can make money from the various financial markets.

In one embodiment, when a player reaches the pinnacle level of skill within the virtual world of the game, e.g., the 'top pit,' the player can access real-world markets through the game interface, where the skills, techniques, and methods they have learned can be put to real-world use. In one embodiment, financial gains and losses from trading real-world financial objects from the game interface can be incorporated back into the virtual world of the game. For example, the game can utilize a point system that correlates players' real-world financial success or failure into the rankings of characters within the game, so that the players' score can reflect a blend of real-world and virtual world financial performance.

In one embodiment, when a player's character has reached a certain level within the game, the character can have access to special trading objects that can exist both in the virtual game world and the real world. Financial data, e.g., trading prices of the special trading object can from the real-world can be implemented in the virtual world game play. Thus, a player can become well acquainted with the behavior of a special trading object in the virtual world before risking real money trading the special trading object in the real world. When the player feels that they are ready, they can switch game play from virtual-world to real-world as desired, and vice-versa. In one embodiment, the special trading object can be a micro-exchange product owned or managed by the game provider(s).

In one embodiment, the trading-themed game can serve as a real-world trading platform. For example, a player can place real-world orders with, e.g., brokers, clearinghouses, banks, and the like to buy, sell, or otherwise manage holdings of real-world domestic and foreign trading objects such as commodities, stocks, bonds, currencies, so-called "micro-products," product "baskets," and the like. In a preferred embodiment, real pricing data (e.g., "tick data") from past or current trading of real-world tradable objects can be used in the game environment to educate the player on real-world movement of financial products. Thus, in one embodiment, a player can gain knowledge, experience, and practice in trading real-world financial objects in a game environment with no or minimal risk to their real-world financial position.

In one embodiment, the game can perform trading activities, e.g., buy and sell trading objects on existing real-world markets through a network connection to one or more selected exchanges, brokerages, banks, and the like. The game platform can provide the ability for a player to log in to a selected brokerage account to engage in live-market trading if so desired. If live-market trading is chosen, the player can be connected to one or more brokerages; live market data used in the game can be provided by, e.g., an exchange collocation market data feed handler. The player can generate trades via a front-end interface on the game platform in data communication with an exchange collocation order router handler, which itself is in data communication with an exchange matching system. Trades can thus be executed and settled into the account of the player.

In one embodiment, the game can serve as a trading platform, a stand-alone exchange platform, or an electronic crossing network (ECN). In such a capacity, the game can include dedicated software to trade proprietary products such as, for example, new, virtual, financial-trading products. In one embodiment, the game platform can provide the ability for the player to create an account with a brokerage, log in, and chose live-market trading. If live trading is chosen, the player's corresponding brokerage accounts can be enabled for live trading. In this case live-market data can drive the game, and trades can be generated via the game interface. In one embodiment, trades can be accepted or rejected by a risk filter that can be incorporated into the game and controlled by game logic. Accepted trades can be matched by an exchange matching engine, settled in the player's real-world brokerage account, for example. Market makers, e.g., a broker-dealer firm that accepts the risk of holding a certain number of shares of a particular security in order to facilitate trading in that security, can provide two-sided liquidity in selected embodiments.

In one embodiment, the trading-themed game can accommodate multiple players who can interact with each other in the game environment in substantially real-time (not accounting for delays in network traffic and other factors which may be beyond the control of the player).

In one embodiment, the trading-themed game can have one or more virtual worlds. A virtual world, within the game context, can be, as described above, an environment that represents real or imaginary constructs and parameters. Worlds or portions thereof within the game can be controlled by game logic and graphically represented on a display device, such as a display device of a personal computer, smart phone, tablet, or the like. For example, in one embodiment, a game can have a virtual world interface for trading one or more virtual product(s) or a real world interface for trading real-world product(s). Games which incorporate real-world trading capability can be implemented as an independent software vendor (ISV) or other type of real-world trading platform so that the player can use the game as an online trading tool, similar to those provided by brokerages such as E-Trade Financial Corporation, TD Ameritrade, and other brokerages. In one embodiment, the trading-based game can provide virtual- and real-world game interaction which the player can switch between or, in some embodiments, interact with substantially simultaneously.

In one exemplary aspect, a trading-themed game of the type described herein can be played using a character, embodiment, personification, or avatar of the player (generally referred to herein simply as "character"). In one embodiment, a player can select a character from a plurality of pre-existing characters stored on a game controller computing device, one embodiment of which is described in greater detail herein. In another embodiment, the player can upload an electronic file to the game controller containing an electronic version of the character of their choice, e.g., a portion of a photograph, a cartoon character, etc. In yet another embodiment, the player can build their character from an array of graphical elements provided by the game, e.g., using supplied body types, hair styles, clothes, etc. from a repository of graphical game elements. The character can be chosen by the player, e.g., during setup of the player's account. The player can add supplemental information to the character such as a name, nickname or 'handle,' location of the player, and any other desired information or indicia.

In one embodiment, players can play within a variety of game levels that correspond to, e.g., the player's performance in the game or other factors, such as the player's experience in the real-world marketplace. For example, a brand-new player can be assigned at level zero (0) which may be the beginner level in the game. A player can move up to higher levels, e.g., level 1, 2, 3, . . . n etc. based on criteria selected by game administrators or controlled by game logic. For example, a game administrator can allow a player to move up a level upon showing a certain level of success in market trading within the game or upon completing trading education credits which can be part of the game; upon successfully completing trades in a pre-determined number of trading objects (e.g., foreign markets, currencies, and commodities); upon making a profit from a trade that exceeds a pre-determined threshold (e.g., a profit of $10,000 from a single trade); or other factors, including combinations thereof.

In one embodiment, game administration can be automated according to programmed game logic so that once a player reaches a pre-determined threshold for moving to the next level, or moving down a level based on their performance, the level assignment is completed by the game system automatically. It will be understood that criteria for moving player levels up or down are practically infinite and cannot be disclosed comprehensively herein. However, skilled artisans in the programming and financial arts will recognize factors that could show a requisite level of competence to be placed at a given level of the game. For example, a player who consistently lost money in trades may be demoted to lower levels of the game, while players who outperform markets on a regular basis may be promoted to higher levels. Similarly, in one embodiment, the game system logic can be such that a player must have reached a minimum level in order to place real-world trades in the markets as described herein. In one embodiment, a player can enter the game as a "rookie," which can represent the lowest level, with little to no knowledge of the process or strategy of market trading. Alternatively, a user can select to be placed at a game level commensurate with their real-world experience. For example, a player having years of experience trading on the open markets can be placed at an intermediate or expert level as appropriate.

In one embodiment, various levels of game play can be represented by virtual "trading pits" or trading scenes reflective of real-world trading environments such as the floor of the New York Stock Exchange. A player can work their way up through the various trading pit levels according to predetermined criteria which can be incorporated into game logic. For example, a player can advance to a higher trading pit level by demonstrating certain trading skills, by showing that they possess certain knowledge of trading objects or markets, by collecting tokens corresponding to completing various predetermined tasks, e.g., completing educational sessions provided by the game, successfully executing a trade in each trading market the game system supports, winning trading battles, points, or money in the trading pits and training grounds against other players or virtual players, including combinations thereof, and other skills. Similarly, the player can be demoted to lower trading pit levels according to predetermined criteria, such as losing significant amounts of money, whether real-world or virtual, making illogical trades, or according to other factors.

In general, trading-themed games of the type described herein can include logic that allows the player to play the game according to predetermined storylines. In one storyline aspect, players can attain privileges to meet with, e.g., master-trader characters, which, in one embodiment, can be the character of another player who mentors the player during game-play. In another embodiment, the master-trader character can be a character controlled by game logic that provides mentoring to the player with respect to market trading. As with placing players at various skill levels or trading pits, the privilege to meet with master-trader characters can be predetermined by, e.g., game administrators or programmed game logic.

In one embodiment, a trading-themed game can provide mentor characters who can teach lessons of successful trading, intervene before the player executes a trade, sale, or purchase that may lead to financial loss, or provide other help or advice to players. In one example, a mentor character can be another player who can access, either invited by the player or authorized by a game administrator, a player's activity, preferably in substantially real-time. In another example, a mentor character can be a computer-generated character controlled by game logic that appears on the player's screen when the system determines the player may need assistance or when the player is about to make a potentially poor move. In one such example which could play out in a real- or virtual-world game environment, a player may be about to execute a purchase of a financial product which has been plummeting because of a news story released within the last hour. In this example, before the player completes the transaction (the purchase of the falling financial product) a character can be made to pop up on the player's screen asking whether they have seen the news story and if they wish to continue the transaction. The player can acknowledge by, e.g., clicking "yes" or "no" buttons corresponding with the warning message.

In another example, players can take lessons from, or interact virtually with "master-level" avatars or characters who teach trading philosophies or lessons. Each avatar can teach various aspects of trading, e.g., background, mechanics, theories, etc., from multiple perspectives, e.g. fundamental, technical, price action, etc., pattern recognition, and ways to win the game. In one embodiment, "winning" the game can correlate with having the most-funded virtual- or real-world bank account or the greatest number of points relative to other game players. In various embodiments, "winning" the game need not necessarily terminate game play; for example, the game system can maintain player rankings according to certain criteria such as the amount of money in their bank account, the number of successful trades, or other criteria, which may motivate players to continue playing the game.

In one embodiment, master-level avatars can mentor the player's character through a variety of visually-appealing "fantasy" training grounds, which may be games within the trading-theme game itself, to further develop trading talent and wisdom, and teach certain aspects of trading. Non-limiting examples of virtual training ground arenas include lessons that utilize trivia, puzzles, sports games, racing, fighting or other adventure action arenas. Each training style can teach various aspects of financial trading from one or more perspectives, such as fundamental, technical, price action, pattern recognition, etc., and ways to win in the trading-themed game as well as make money in the real-world markets. In one embodiment, players can earn virtual- or real-world goods through game play.

In one embodiment, players can also receive virtual- or real-world goods as gifts, e.g., from other players, or purchase them using virtual- or real-world funds. In one embodiment, virtual goods can be digital representations of real world goods and can be used for various game-play purposes. For example, in one embodiment, a user can be allowed to play the game free for a predetermined amount of time. A player can extend the play time by paying with virtual goods, e.g., tokens, to a virtual bank, a moderator, a game administrator, or other entity. In various embodiments, players can enhance or personalize their game environments, accelerate their progress in the game, share and trade wealth with other players, etc., using virtual goods. In one aspect, players' acquisition, gifting, and purchase of virtual goods can create social interaction that increases players' engagement with the game and with each other.

In general, virtual goods can provide the opportunity for the player to purchase something of value to them, whether it is a virtual- or real-world object, time, or other thing. For example, a virtual good can be the content type or game-play environment of the game itself; introductory game content can be basic at one price, while premium game content can be extravagant, with many more options and game-play enhancements than the introductory content, and can be set at a different price, usually higher. Non-limiting examples of premium game content can include time gates (e.g., the amount of time a player can play the game for a certain price), content gates, aesthetic items, the ability to perform extended game-play moves such as jumping levels or receiving "tips" from virtual informants on potentially lucrative investments, consumables subscriptions, stackable subscriptions, rare items, time limited items, sale items, gifts, accelerators, physical goods, and other premium game content.

In one embodiment, time gates can allow players to play for a pre-determined period of time, after which access to the game can become locked out until the player pays a "continuation" fee (which can be paid, e.g., using virtual goods). In one example, a player can be authorized to play for one hour according to a free trial period; to play longer than the one hour period, the player could be required to pay, e.g., $100 in virtual cash, wherein cash can be a virtual good. In another example, content gates can provide the ability for players to play an initial "teaser" portion of the game that has basic content for free, but to unlock access to additional content the player would need to pay a fee, e.g., $200 in virtual cash or points. In one embodiment, a player can pay with virtual- or real-world goods to unlock one or more game system restrictions, e.g., time gates, content gates, etc.

In one embodiment, players can have the capability of purchasing items for their characters that can reflect their identity or status to other game players. For example, players can pay for a unique or expressive character outfit that they can show off to other game players. In another example, a player can purchase "abilities" or super powers which can be access-controlled virtual environments or layers that allow the player to experience the game in a new or unique way, or give them capabilities that other players may not have. For example, a player could purchase "jumping boots" that could provide the capability of the player's character to fly through game levels in a way that lets them re-experience the game all over again or transport themselves to different portions of the virtual world. In another example, a player could purchase "spyglasses" which could provide the ability to peek in on other players' game play, or watch players' actions at higher levels. In yet another example, items available for purchase may be considered "consumables," in that they can expire after a period of time or after a number of uses. For example, a player could buy a potion that increases the character's presence on the floor of a trading pit, but can only be used three times, after which the consumable item may disappear from the user's cache of purchased items.

In one embodiment, players can purchase subscriptions for game play. Subscriptions can allow a player to access the game according to established criteria, e.g., $20 allows six months of access to the game, $40 allows access for a year, etc. In another example, extra digital storage space can be offered for advanced players with payment of a monthly fee.

In general, the game system can provide "rare" items that are available to be purchased by players for their characters or by the characters in the game environment. The number of rare items available for purchase can be limited so that acquiring a rare item can provide a sense of value to the purchaser. Some rare items can be offered for purchase within specified time limits, e.g., for no longer than an hour, to provide the sense that the item truly is rare or hard to acquire within the virtual world. In general, items, including rare items and abilities can be gifted to other players to seek out or maintain real-world social interactions.

In one embodiment, a goal of the game can be for a player to qualify for a top-level trading environment, such as a 'top pit,' which is described in greater detail herein. In general, a top pit can be an uppermost play level where a virtual financial-trading product(s) can be traded in the pit or on electronic screens surrounding the pit that may not be available for trade at other pit levels. In one embodiment, the player can trade trading objects in the top pit or utilizing a trading interface display, described in greater detail herein. In one embodiment, a player can switch back and forth between the top pit game environment and the screen display as desired.

In one embodiment, in order to trade in the top pit, the player would need to have met criteria to play at that level which can be defined, e.g., by game logic as described herein. When the player's skills reach a certain predetermined level, the players can be able to translate their skills and knowledge into the live-trading market, and create actual trading income in the real world trading real products. In this and other embodiments the game has the capacity to serve as an actual trading platform. Furthermore, the platform of the game can provide trading platform faceplates with unique game style configurations. Furthermore, the education and skills gained through the game can be transferable and compatible with other major trading platforms in the real world.

Implementation and Enablement of Various Game Embodiments

In one general aspect, trading-themed games of the type described herein can be displayed on various computing devices, allowing the game to be played on various computer platforms and operating systems. Exemplary computer platforms include, but are not limited to smartphone devices and tablets such as those sold under the iPhone, iPod, and iPad brand by Apple, Inc., of Cupertino, Calif., USA. Exemplary computer operating systems that the game can be carried out on include, but are not limited to the following operating systems: Android (Google, Inc., Mountain View, Calif., USA), iOS and OS X (Apple, Inc., supra), and Windows (Microsoft, Inc., Redmond, Wash., USA), among others.

In various embodiments, trading-themed games of the type described herein can be played using computers, online gaming systems, through modules of online social network sites (e.g., Facebook), other website modules, video gaming consoles such as the Xbox series (Microsoft, Inc. supra), Wii and Nintendo series of handheld/consoles (Nintendo, Inc., Kyoto, Japan), and Playstation series (including the PSP handheld/console platforms) (Sony Computer Entertainment, Inc., Tokyo, Japan).

In general, a trading-themed game can be obtained by users in a variety of ways. For example, a user can download an executable program onto their computing device from a remote repository of game applications. Exemplary game repositories include, but are not limited to the Google Play repository for the Android system and the "App Store," provided by Apple, Inc. (supra) which provides, inter alia, software for Apple devices. In one alternative method, a user can install a trading-themed game from a medium capable of storing electronic information such as an installation disk or a cartridge-style medium, such as those used for video game platforms, e.g., those for Wii or Nintendo gaming consoles.

Figure 1:
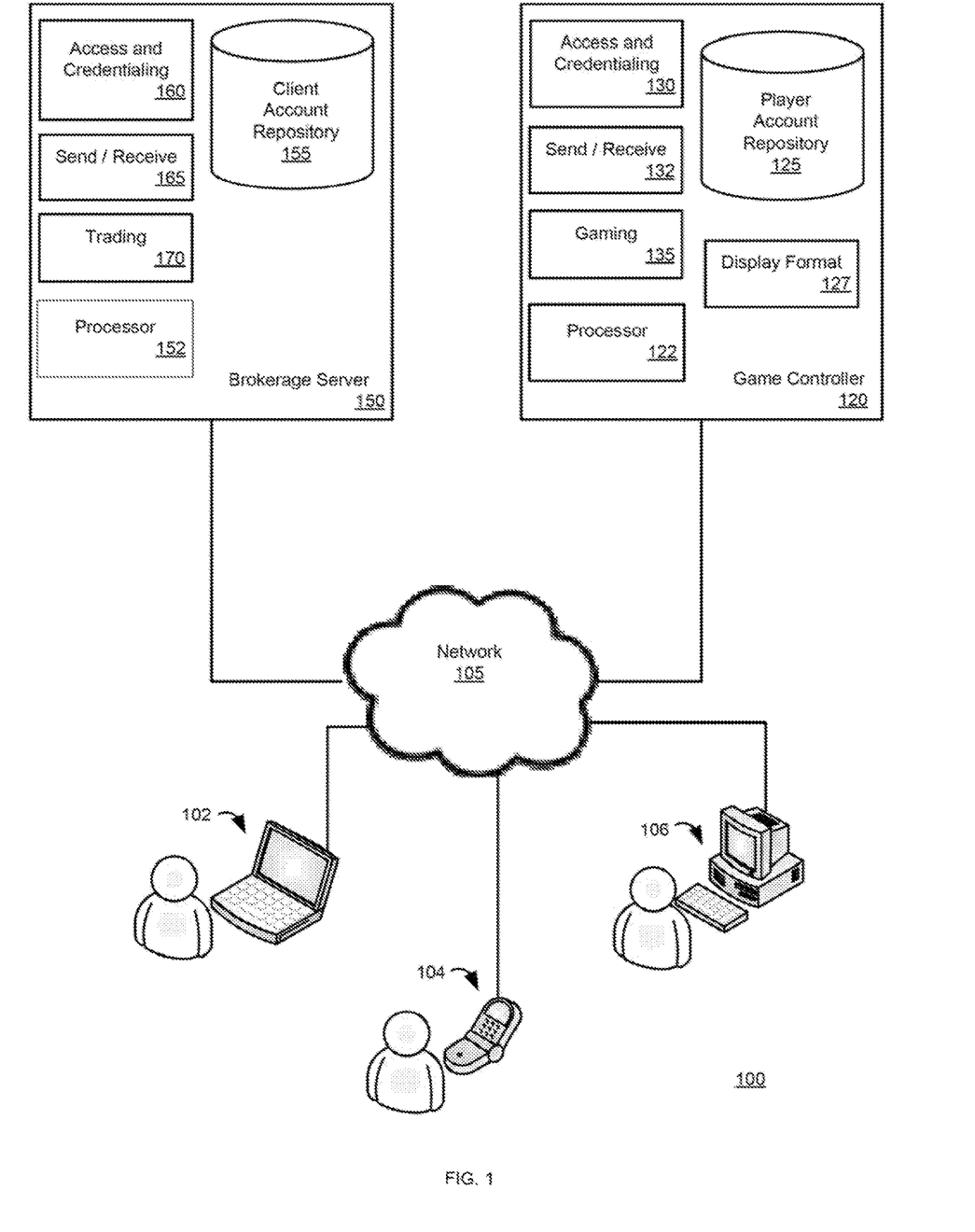
FIG. 1 is a gaming system according to one embodiment.

In general, game-play features as described herein, including alternatives, can be controlled by logic that can be programmed by known programming techniques for the purpose of enhancing game play. Referring now to FIG. 1, a gaming system 100 (hereinafter "system") is shown for implementing a trading-themed game of the type described herein according to one embodiment. In this embodiment, the system 100 includes game clients such as laptop or desktop personal computers, portable computing devices such as smartphones, cellular telephones, tablets, and the like that can be used by game players. For example, a player can play the game on a laptop computer 102; a player can play the game on a portable computing device 104 such as a smartphone, tablet, iPad, iPod, or other similar device; and a player can play the game on a desktop personal computer 106. Those skilled in the art will recognize the wide variety of computing devices available to consumers and the ability to utilize such devices for game play; thus, the aforementioned computing device alternatives is by no means comprehensive.

In this embodiment, the system 100 includes a computer network 105. The computer network 105 can be any type of network that provides communication between computing devices. Non-limiting examples of the network 105 include the Internet, ethernets, Wide-Area Networks (WANs) and Local-Area Networks (LANs), cellular networks, networks of portable devices that communicate through WI-FI or Bluetooth protocols, "clouds," and other networks. In this embodiment, the network 105 can provide the ability for system 100 computing devices to communicate with each other over selected protocols that can be chosen to maximize performance of the game. In some embodiments, secure communication protocols can be used, e.g., secure hypertext transfer protocol (https), as the system 100 may transmit or receive sensitive or private data across the network 105, including player account numbers, passwords, etc.

In this embodiment, the system 100 includes a game controller 120. The game controller 120 can be any type of computer, computer server or network of computer servers known in the art capable of carrying out game functions and game logic as described herein. The electronic components of the game controller 120 can be chosen so as to maximize speed and efficiency of game processes and communication across the network 105. Similarly, the operating system of the game controller 120 can be chosen according to preference, which may take into account speed, efficiency, security, and other factors that will be apparent to those skilled in the art of computing systems and computer network architectures.

One non-limiting example of a game controller 120 is a HP ProLiant DL 360 G6 server with multiple Intel Xeon 5600 series processors having a processor base frequency of 3.33 GHz, 192 GB of RAM, 2 PCIE expansion slots, 1 GB or 10 GB network controllers, hot plug SFF SATA drives, and redundant power supplies, available from Hewlett-Packard, Inc, 3000 Hanover Street, Palo Alto, Calif. One non-limiting example of a suitable operating system for the game controller 120 is the Redhat Linux Enterprise AS Operating System, available from Red Hat, Inc, 1801 Varsity Drive, Raleigh, N.C.

In this embodiment, the game controller 120 can include one or more modules that carry out various computer-based functions that enable the game to be played. Modules can include, without limitation, computer logic and computer-executable code, e.g., software, which can be stored in a computer-accessible and readable medium such as a hard disk drive or memory such as random access memory (RAM) or read-only memory (ROM). It will be understood that the modules and their functions as described herein are non-limiting examples and that they can be modified, adapted, or substituted for alternative or equivalent forms as desired to achieve certain benefits, e.g., game performance. Similarly, the modules described herein can include sub-modules to a desired sub-module granularity that carry out various logic and other functions of the game. In this embodiment, each module can be in electronic communication with other modules, repositories, and other components so that information can be sent, stored, and retrieved throughout the server 120.

In this embodiment, the game controller 120 includes a player account repository 125 (hereinafter "player repository"). The player repository 125 can be a repository that stores any type of player information used in the game, including, but not limited to: player user name, access password, account information, real name, age, physical location, e.g., "Chicago," member level, player statistics, etc. In one embodiment, the repository 125 can be a database stored on the game controller 120; in another embodiment, the repository 125 can be shared across a plurality of computing platforms, e.g., within a cloud network, although not so depicted in FIG. 1. One exemplary, non-limiting database type is a Simple Query Language (SQL) database.

In this embodiment, the gamer server 120 includes a display format module 127. The display format module 127 can perform functions related to generating the requisite computer code so that players can visualize the game on a display screen, as described herein. For example, the display format module 127 can generate computer-readable code in one or more languages such as hypertext markup language (HTML), Java (Sun Microsystems, Inc.), Flash (Macromedia, Inc.), Extensible Markup Language (XML) or other preferred languages. In a further example, the display format module 127 can include logic for creating text, images, and other indicia that together create the "frontend" of the game on the players' computing device. The display format module 127 can also create static pages such as login screens, information screens, help screens, etc. In this embodiment, gaming content can be transmitted to the display format module 127 by among other modules, the access and credentialing module 130 or the gaming module 135 (described below).

In this embodiment, the game controller 120 includes an access and credentialing module 130. In one aspect, the access and credentialing module 130 can perform functions related to allowing and denying access to the game and providing other security features. For example, the access and credentialing module 130 can perform the functions of receiving a player-supplied user name and password combination and accessing the player account repository 125 to verify the correct combination. Upon verifying that the user has supplied the correct user name/password combination, the accessing and credentialing module 130 can allow the player access to the game.

Furthermore, in this embodiment the accessing and credentialing module 130 can perform functions relating to real-world trading activities. For example, if a player is utilizing the real-world trading functionality as described herein, the access and credentialing module 130 can perform necessary functions for communicating with remote servers, hosts, banks, brokers, clearinghouses, etc. so that the player can execute real-world trades and other functions. Other such functions can include, for example, retrieving account balance, funding an account with funds from another bank, broker, or account, accessing positions, and other functions.

Furthermore still, in this embodiment, the accessing and credentialing module 130 can perform functions relating to a player's access level in a game. For example, the accessing and credentialing module 130 can restrict a player's game play to their currently assigned level, e.g., level 1, 2, 3 . . . n, as described herein.

In this embodiment, the game controller 120 includes a send/receive module 132. The send/receive module 132 can include logic for receiving electronic signals from the game clients (e.g., players 102, 104, 106) across the network 105, e.g., player information, game-play information and data, and other electronic signals and pass the signals to the appropriate module for processing. Similarly, the send/receive module 132 can receive information from the various modules of the game controller 120 and send them to the network 105 in a format that allows the information to be sent to the appropriate destination, e.g., the player's computing device. In this and other embodiments, the send/receive module 132 can include necessary computer software, hardware, and peripheral devices to enable communication to and from other computers via the network 105.

One example of intercommunication within the game controller 120 is allowing a player (e.g., player 102) access to the game. In this example, the player 102 can send a request to the game controller 120 for a login page; e.g., the player 102 can point their browser to a login file on the game controller 120 using a uniform resource locator (URL). The access and credentialing module can gather HTML code for creating the login page on the player's computing device and send that code to the display format module 127, so that the page renders correctly on the player's device. The display format module 127 can then send the code to the send/receive module 132 which sends the code to the player's device via the network 105.

Figure 2:
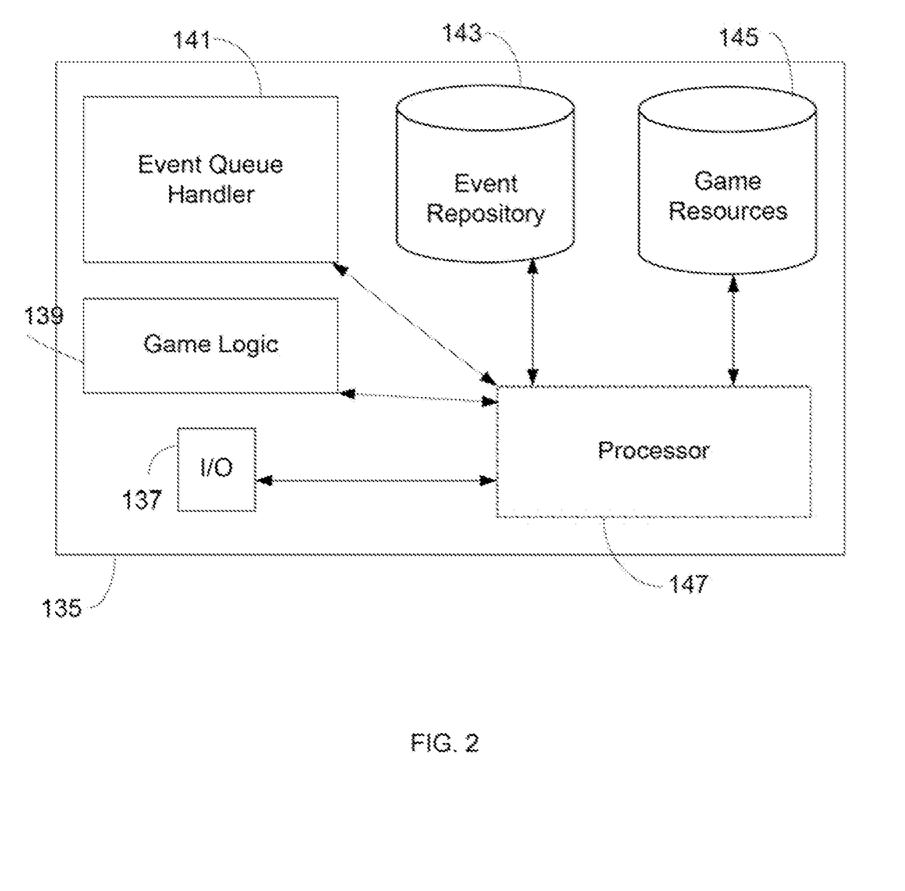
FIG. 2 shows details of a component of the system shown in FIG. 1, according to one embodiment.

In this embodiment, the game controller 120 includes a game controller module 135 which is described in greater detail in FIG. 2. The game controller module 135 can include logic to operate the game online, logic for communicating with game clients engaged in playing the game, and logic for communicating with the other modules present in, or in data communication with the game controller 120.

Referring now to FIG. 2, components of the game controller module 135 are shown in greater detail, according to one embodiment. In this embodiment, the game controller module 135 can optionally include a dedicated processor 147 for carrying out various game control processes, shown in dashed line to indicate it as an alternative component. In other embodiments, the processor of the game controller 120 can be used, e.g., processor 122 described above, for the same or similar functions. The solid, double-headed arrows in FIG. 2 illustrates that the optional processor 147 can be in bi-directional communication with the various modules and repositories; however, it will be understood that while not explicitly illustrated in FIG. 2, each component is capable of sharing or receiving or sharing and receiving data from each other.

In this embodiment, the game controller module 135 includes an event queue handler 141 for keeping track of events for each game being played, e.g., for each game client engaged in playing the game. Events can be stored in an event repository 143 which can be in the form of, e.g., a database such as a SQL database.

In this embodiment, a game logic module 139 is capable of retrieving game resources from a game resources repository 145, creating game play elements, e.g., game data, graphics, including video, such as computer animation and other moving graphical elements, executable program code, player statistics and other relevant game data, and other game-related information. The game resources repository 145 can store some or all of these elements, for example, repeatable text, content layout, graphics elements, style sheets, video animation, sound clips, etc.

In this embodiment, an input/output (I/O) register 137 can receive electronic signals from other components of the game controller 120 and pass those data on to the appropriate module. For example, the I/O register 137 can receive game play data from one or more game clients and pass those data to the game logic module 139 to be processed accordingly. Similarly, the game logic module 139 can pass game-play data to the I/O register 137, which can then be passed to the send/receive module 132 of the game controller 120, which can then be sent to a game client.

While the game controller 120 described herein can be utilized to enable the trading-themed game described herein, it will be understood that other, alternative systems and methods can be used. For example, U.S. Pat. No. 7,824,268 (hereinafter '268) by Harvey et al., filed on Dec. 19, 2006 and entitled "Live Hosted Online Multiplayer Game" describes an online gaming system including a game controller. U.S. Pat. No. 7,824,268 is incorporated herein by reference in its entirety for all purposes. While the game of the '268 patent is entirely different from the instant disclosure, components of the '268 gaming system can nonetheless be used as-is or modified to enable the instant trading-themed game. For example, one of ordinary skill in the art can substitute or modify the game controller 160 and game controller 130 as described in the '268 patent for the gaming module 135 and game controller 120, respectively, as described herein, so as to enable to enable the instant trading-themed game.

Referring back to FIG. 1, in this embodiment, the system 100 includes a brokerage server 150 capable of bi-directional data communication with the game controller 120 through the network 105. In some embodiments, the system 100 can include multiple brokerage servers 150, each hosted by different brokerages, e.g., TD Ameritrade, Inc., ScottTrade, Inc., etc. The game controller 120 can be configured so as to gain access to the brokerage server via known methods, e.g., through username/password combinations, authentication certificates, etc. The brokerage server 150 can serve various types of information utilized by the trading-themed game as described herein. For example, the brokerage server can provide player account data, substantially real-time price quotes on various trading objects, etc. The brokerage server 150 can also accept instructions to buy, sell, or hold trading objects such as stocks, bonds, currencies, etc., similar to the way in which individuals can execute such instructions via applications on smartphones, tablets, and desktop computer applications.

In one example, a game player can be engaged in a trading-themed game as described herein. As described herein, the player can choose, in certain embodiments, to engage in real-world trading during game play. Thus, a player can, during the course of a game, send a request to buy, e.g., a certain stock. The request can be sent from the player's game client, through the network 105, and be received by the game controller 120. The game controller can process the request, e.g., utilizing the game logic module 139 (FIG. 2) and create a "buy" request. The buy request can be sent via the send/receive module 132 to the brokerage server 150 where it can be received, e.g., by a send/receive module 165. An access and credentialing module 160 on the brokerage server can verify the authenticity of the buy request by, e.g., accessing a repository of client account information 155. A trading module 170 can execute software instructions to complete the buy request and obtain the stock. In this example, a processor 152 on the brokerage server can participate in the above steps. While the basic description above can enable real-world buying, selling, and trading of trading objects, it will be understood that each brokerage likely employs different techniques, security measures, and processes for executing client trade requests. Specific instructions for accessing various brokerages around the world can be stored, e.g., in the game resources repository 145 and be accessed when necessary to carry out game play.

Exemplary Game-Play Elements

In one game embodiment, a player can be represented within the game by a cartoon-like character. The player can play their character through various training grounds, where, e.g., the player can gather certain key trading skills, knowledge, or points from master avatars as described herein. Such skills, knowledge, or points can be required, in certain embodiments, in order to move on in the game and succeed in various trading pits, where trading pits can be trading arenas of varying levels of difficulty within the game environment.

In one exemplary aspect, the difficulty or perceived player challenge of a particular trading pit level can be defined by certain parameters which can be controlled by game logic. For example, factors that can influence the trading difficulty of a pit level include, without limitation, the pace of trading on the pit floor, e.g., from casual to frenzied, erratic swings or movements in the markets, slow to fast-paced media announcements, etc. A player can work their way up to a 'top pit' where the player can further hone their trading skills. When the player's skills reach a certain level of proficiency, they can translate their skills and knowledge into trading real-world financial products.

In one embodiment, simulated trading pits can be graphically reflected as a crowded trading pit similar to those found on real-world exchange floors, such as the New York Stock Exchange. Trading pits can be populated with other active players or computer-generated players so as to convey a high-energy feel to the player. Each Trading Pit level can provide a spectrum of trading day scenarios, ranging from a simple small range, to trading sessions where the market wildly spikes and lurches. The Trading Pit's trading session can unfold on real historical data, dynamically driven data, and live data, according to preference.

In one embodiment, once a player has reached the Top Pit (via earning or purchasing their points), they can then earn (or purchase) another threshold number of points to gain access to Live Trading. Seasoned real-world traders may choose to bypass earning the threshold number of points to get into the Top Pit immediately; they may also bypass earning the threshold number of points in the Top Pit, and simply opt to pay a fee to gain instant access to Live Trading. In other embodiments, players can be granted free access to live trading according to preference by, e.g., game administrators.

In one exemplary aspect, any player can also have the ability to bypass any earned point requirements by purchasing the points necessary to activate the Live Trading mode. In some embodiments, the player can be required to open a real-world trading account with a real-world trading partner or brokerage in order to trade real-world financial products.

In one embodiment, in order to avoid any confusion between real-world trading and that conducted within the game, the Live Trading mode can be turned off and on via the main menu, where the player can switch out of game mode into live trading mode. In one embodiment, while the game provider can offer players 'gameified' trading interface choices, the actual Live Trading and real world trading accounts can be hosted, managed, and maintained by known methods, e.g., FX technology and real-world brokerage firms.

Figure 3:
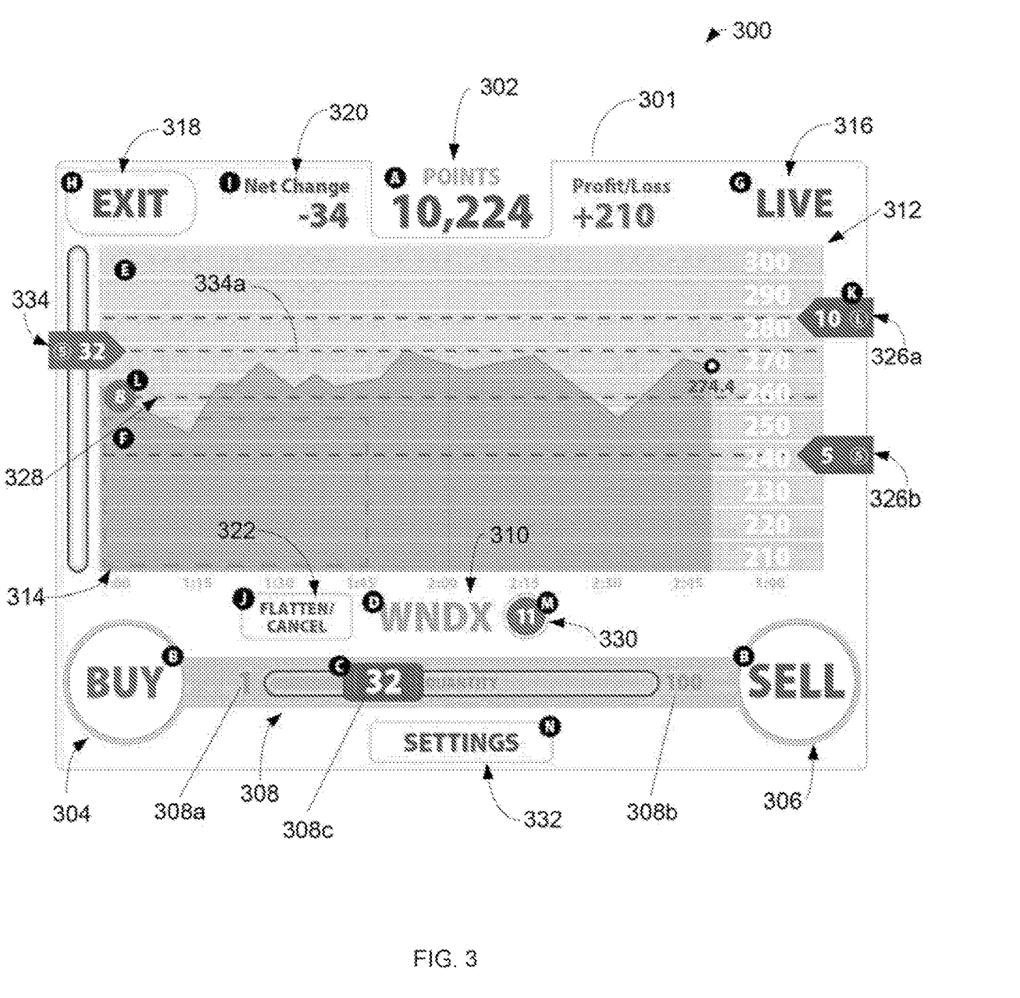
FIG. 3 shows an exemplary screen-snapshot of a trading-themed game, according to one embodiment.

Referring now to FIG. 3, a trading-themed game interface 300 is shown according to one embodiment. In one exemplary aspect, the trading interface 300 can be used in both the game's Trading Pits as well as in Live Trading mode, to conduct both simulated and real-world trading respectively.

In the embodiment shown, the interface includes a display area 301. The display area 301 can be the area where the interface is shown on a user's computing device. In preferred embodiments, the display area 301 is an area on a touchscreen portion of a computing device so that the player can interact with the game by physically interacting—e.g., tapping, sliding, etc.—selected portions of the display area according to their desired game move.

In this embodiment, the interface includes a "points" area 302. Points can be the player's primary gauge of success or failure over the duration of a session or combined game play time. A player can leave a session with more or less points than they had upon entering the session. The large, centered number represents the player's current point total in this embodiment. This number can update throughout the session as the player buys and sells financial product(s). The number to the right of the player's total points can reflect the overall change in the player's point total from the time of entering a session to the current time, e.g., reflective of a net gain or loss. This secondary number can be color-coded green for positive and red for negative which can help the player keep track of their progress during a game play session.

In this embodiment, the interface 300 includes a buy button 304 and a sell button 306. Configured for easy access on, e.g., a touchscreen, the Buy and Sell buttons can buy or sell instantaneously (with a market order) when they are tapped, e.g., on a touchscreen device or clicked with a selector tool such as a mouse. In one example, if the player clicks and holds (or touches and holds) the Buy or Sell button for 2 seconds, a vertical slider bar can pop out from the top of the button (along the left or right side of the interface screen). Players can use this slider to select a specific price point for a Limit or Stop order, described in greater detail below. All transactions can be handled in the currently selected quantity as displayed by the product quantity slider.

In this embodiment, the interface 300 includes a product quantity slider 308. The product quantity slider 308 includes a minimum selectable number 308*a* (1 in this example), a maximum selectable number 308*b* (100 in this example) and a currently selected number 308*c* (32 in this example). The variable sliding number can represent the quantity of the trading object the player wishes to buy or sell. Players can adjust this slider number throughout a session by sliding the indicator back and forth.

In this embodiment, the interface 300 includes a product indicator 310. The product indicator 310 can be a static representation of the financial product that is being traded. In one embodiment, all of the trading during the virtual Trading Pit sessions or training grounds can utilize a virtual financial product called WNDX, and during live trading, the player can have the ability to select FX markets and other financial products, including the game provider's real-world micro FX or other financial product, e.g., WNDX.

In this embodiment, the interface 300 includes a Market Visualizer 312. In this embodiment, the Market Visualizer 312 is a line chart displaying the current product's price over time ending with the last tick of relevant market data. Players can use this chart to see the rises and falls in the product price so as to make informed decisions by viewing where the price has been and might go next. The Market Visualizer 312 can also allow players the ability to buy and sell when the product's price reaches a player-specified threshold. In one embodiment, by holding down on either the Buy or Sell buttons for 2 seconds, the player can set points on the chart to either buy or sell at the selected quantity at the selected price on the chart. By keeping all buying and selling interactions linked to the same two buttons, the interface can inherently be streamlined for handheld devices and user-friendly.

In this embodiment, the interface 300 includes a news feed section 314 (illustrated by the dashed line indicated by reference numeral 314). During Trading Pit sessions, one portion of the screen can be devoted to simulated live news feeds. For example, at random intervals in a trading session, a newscast can animate on-screen, delivering pertinent information about external world news and other financial figures announcements that may affect the market. In some situations, this information may be obvious to any player, e.g., " . . . prices have been falling all afternoon" and in others the information may be disguised or altogether irrelevant, e.g., " . . . a heavy winter storm on the east coast has left thousands without power." These various types of information (news, financial announcements, world events, time of day) can illustrate to the player when to be extra cautious, and what to possibly expect—so that players can learn to grow comfortable with the various factors that affect the market's movement both in game play and real-world environments—and how little or much the market moves under various circumstances and times of the day.

In this embodiment, the interface 300 includes a Live Trading indicator 316. During Live Trading sessions, an indicator can display in the top-right corner of the screen. This indicator can inform the player that their current trading session is either simulated (in the Trading Pits) or live (Live Trading).

In this embodiment, the interface 300 includes an Exit Button 318 which can allow players to exit their current trading session. When pressed, it can bring up a dialogue box asking the player if they are sure that they want to quit the session.

In this embodiment, the interface 300 includes a Net Change Indicator 320. The Net Change indicator 320 can show the overall market trend over the course of a session. If the overall price has gone up, the number displayed can be shown in green, e.g. If the overall price has gone down, the number can be shown in red, e.g.

In this embodiment, the interface 300 includes a Flatten Button 322. The Flatten Button 322 can be used to flatten and cancel orders. The Flatten All choice can be used to flatten any open positions, where a Cancel All choice can be used to cancel any resting orders.

In this embodiment, the interface 300 includes a Stop Indicator 326*a* and a Limit Indicator 326*b*. These indicators can be, for example, icons having respective horizontal lines extending therefrom, as shown, that are displayed on unfilled orders to inform the user of the order type.

In this embodiment, the interface 300 includes an Average Fill Line 328 which is shown as a dashed line representing the average fill price of the player's position. As the player's orders are filled throughout a session, the Average Fill Line can move up and down on the chart to represent the average price quantity of the player's the open positions.

In this embodiment, the interface 300 includes a Net Position Indicator 330. The Net Position Indicator 330 can inform the player how many contracts that they are long or short on. For instance, if the player buys 11 contracts, it could display 11 in a green circle (long). If they then sold 15, it could display 4 in a red circle (short). If the player has no open positions, then Net Position indicator could display a zero (0) inside a white circle.

In this embodiment, the interface 300 includes a Settings button 332. At any time in a session, players can select Settings to access trader tools and adjust multiple elements of the trading interface. Exemplary settings can include, without limitation: 1) a Set Stop Order/Set Limit Order that allows the user the same functionality as placing an order from the interface, but replaces the slider with the ability to manually enter the order price point; 2) Order Quantity, allowing the user to manually enter the quantity; 3) Chart Indicators, allowing the user the ability to toggle on/off several trading chart visual aids (Moving Average, Volume, Volatility, and Bollinger Bands, etc.); 4) Chart Line Style(s), allowing the user to select one of three different chart style visualizations (Line, Candlestick, or OHLC); 5) Chart Timeframe, allowing the user to select different chart timeframes to view the market, e.g., 1 min, 5 min, 15 min, 30 min, 60 min., etc.; 6) Quick Statistics, allowing the user to reference multiple statistics regarding the current trading session (e.g., Ask Price, Bid Price, Daily High, Daily Low, Net Change, Volume, etc.); 7) Order Cancels Order (OCO), allowing the user the ability to connect orders with this OCO functionality, such that if one of the orders is executed, the remaining orders connected to it are all canceled; 8) Trailing Stop, allowing the player to set a stop order to trail a profitable position and lock in profits; 9) Collar, allowing the player the ability to place buy and sell orders (Stop and Limit combination order) simultaneously, so as to manage and set profit target and maximum loss parameters; 10) Auto-Exit, allowing players to set a specific time for their account to flatten all open positions and cancel any resting orders; 11) Drawing Tools, allowing players the ability to draw modifiable lines between two points on the chart to help analyze market data; 12) Execution Log, allowing the player to view a grid log of all trading transactions and orders during the current trading session; 13) Alerts, allowing the player to select times or price points which will fire off alert messages to the player; and 14) Faceplate, allowing the player the ability to change the trading interface theme (or faceplate) of the trading pits.

In this embodiment, the interface 300 includes a slidable price-setting button 334. In some embodiments, the price-setting button 334 may be absent on the interface 300 until, e.g., the player presses and holds the buy button 304 or the sell button 306. This action can cause the slider button to appear so that the user can set a desired buy or sell point. A dashed line 334a extending from the price-setting button 334 allows the player to visualize their price point with respect to historical market prices. In one embodiment, when the player sets their price point for buying or selling a tradable object, e.g., by releasing their finger from the screen, a menu can pop up containing executable options. For example, if the player is placing an order (buying), the menu items can include options for "limit," "stop," "cancel," etc.

In one embodiment, over the course of playing the game, the player can interact with the trading interface in a variety of fun, interactive ways. In some cases, the trading interface will take on different metaphoric forms to help illustrate basic trading principles to the player. During a trading session, the player can have the ability to cycle through and select various trading interfaces according to preference. This added layer can help to 'gameify' the trading session experience.

Figure 4:
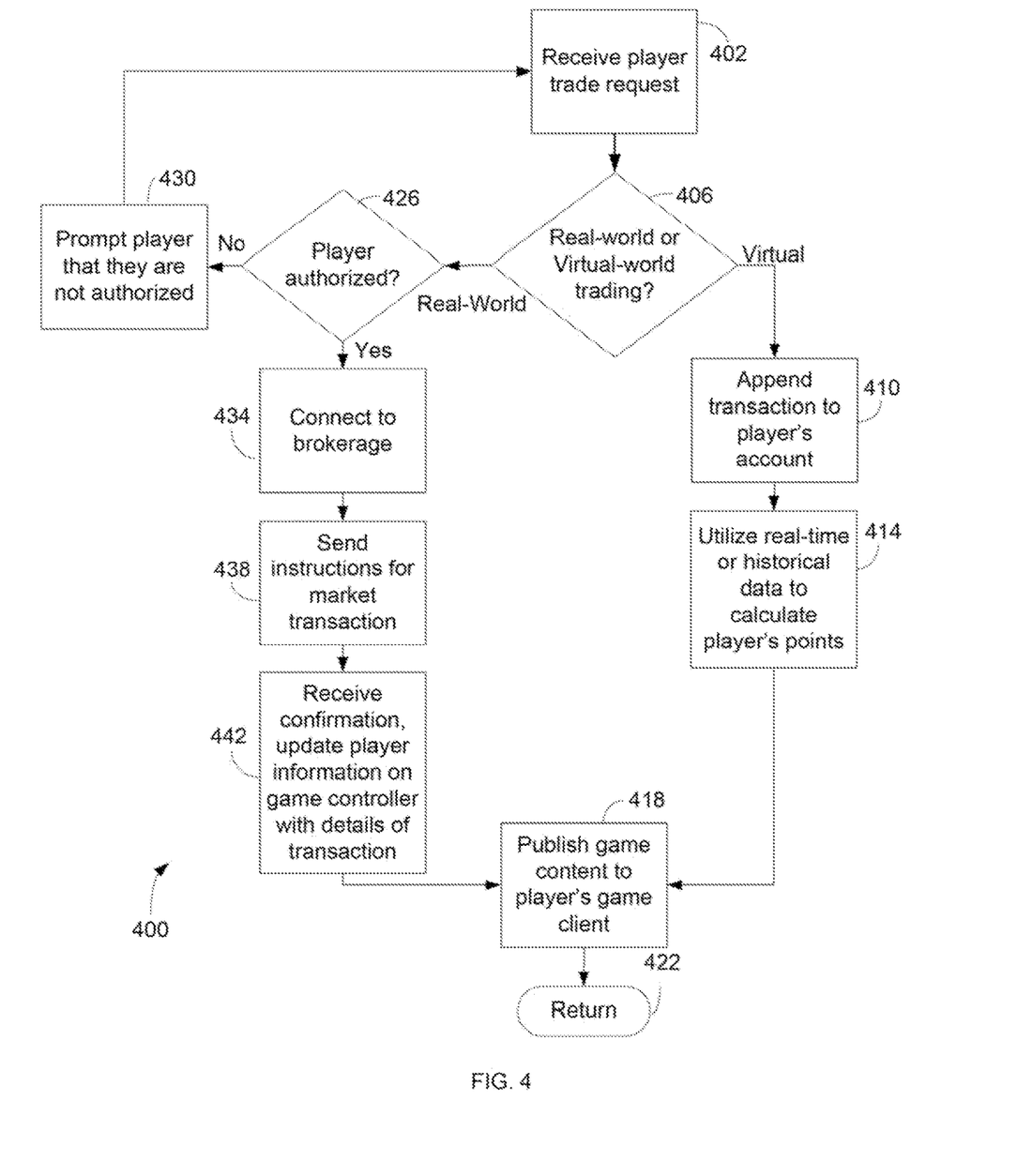
FIG. 4 shows a flowchart of an exemplary game system process, according to one embodiment.

Referring now to FIG. 4, a flowchart 400 is presented. Flowchart 400 can illustrate steps performed by the game controller associated with receiving a trade request from the player according to one embodiment. In describing flowchart 400, reference is made to the system 100 described with respect to FIG. 1.

Beginning at step 402, the game controller can receive the trade request from the player. A trade request can be instantiated by, e.g., the player selecting a trading object from the user interface described in FIG. 3, and activating the "buy" or "sell" buttons. Next, at step 406, the game controller can determine whether the request is a real-world or virtual-world request. Such information can be obtained, e.g., by determining the player's game play state, e.g., real-world or virtual world, which can be stored, e.g., in the event repository 143 described in FIG. 2. If the player's state is the virtual world, the process proceeds to step 410, where the request can be recorded, e.g., that the player bought a certain amount of stock at a certain price, which can be obtained from real-time or historical price data. Next, at step 414, the user's position can be calculated, to include the instant transaction. At step 418, game content, such as an affirmation of the transaction and the player's updated point total can be published to the player's game client. At step 422, the process can repeat, beginning at step 402, when the player instantiates a subsequent trade request.

Referring back to decision point 406, if the player's state in the game is real-world, the system can check, e.g., via the access and credentialing module 130 described in FIG. 1, whether the player has achieved a status in the game that allows them to make real-world purchases and trades. If the player is not authorized, the system can prompt the player as such, step 430. In addition, the system can generate a friendly message offering suggestions on how the player can become authorized for real-world trading, including suggestions on courses they need to take to satisfy the stipulations of such functionality.

If the player is authorized for real-world trades, the process continues to step 434, where the system can connect to a brokerage, preferably, a brokerage where the player maintains an active account. Next, at step 438, the system can transmit instructions to execute the market transaction selected by the player. A market transaction instruction can be, e.g., to buy 1000 shares of WNDX.

Next, at step 442, the system can receive confirmation of the transaction and update the player's account in the game. For example, the system can add the 1000 shares of WNDX purchased in the transaction to the player's virtual account in the game. Next, at step 418, game content, such as an affirmation of the transaction and the player's updated point total can be published to the player's game client. At step 422, the process can repeat, beginning at step 402, when the player instantiates a subsequent trade request.

In one embodiment, the player can freely exit a Live Trading session at any time, although if there are any open positions, the player may be warned that they have open positions, which can be closed out or flattened prior to exiting. Similarly if a player still has open positions when a Live Trading session is at the end of the trading session they can be automatically flattened one minute before the Live Trading session's closing time.

In one embodiment, in order to accommodate a global MMO multi-player game experience, the Trading Pits can be open 24 hours/day and 365 days/year, but the Trading Pits can also have a 24 hour schedule of opening and closing times for sessions. This regular schedule of open and close times for daily trading sessions can better imitate the real world movements of the markets, and better teach the players how to deal with the markets.

In one embodiment, within the 24 hour cycle, a Trading Pit session can have a start time that corresponds to an opening time of a market or exchange, e.g., the New York Stock Exchange. Thus during certain times of the day, the Trading Pit can substitute live data (instead of historical or dynamically driven data) to drive that Trading Pit's session, and thereby better prepare the player for real world market movement. The game provider can also host Trading Pit online competitions or tournaments where players compete for the highest score using the same simulated market data or live, real-world market data.

In one embodiment, Trading Pit sessions can differ from Live Trading sessions in that Trading Pit sessions may run on historical or artificial dynamic (and in some cases live) market data, and may only simulate trading profits using game points. Live Trading can run on live real-world market data, and can allow for the player to trade real world micro FX products or other financial products. In one embodiment, the player can choose to have the live trading interface appear nearly identical to the trading interface in the virtual Trading Pits, with the primary distinction of the 'Live Trading active' indicator being toggled to its active state. Upon entering a Live Trading session, there can also be a secondary login stage to prevent players from accidentally switching to Live Trading mode.

In one embodiment, the game can offer teachings to the players embodied in fictitious learning and training ground environments. Topics covered in these environments can include, but are not limited to: history of trading, trading mechanics, risk management, trading rules and philosophies, etc.

In one embodiment, the player can score points for each learning task or training task they complete within a learning ground environment, which can include, e.g., mini game levels, interactive video tutorials, puzzles, tests, and trivia challenge levels. The amount of points earned can depend on the score they earn.

In one exemplary aspect, a player's character can attend interactive training video sessions within a learning and training ground environment. Interactive videos can be tied to the character and instantiated as the character enters the virtual learning or training ground environment.

In one exemplary aspect, when a video prompts for a player response, their character can emote in a way to answer the call. Based on their answer they can also emote accordingly. Wrong answers can evoke negative animations while a right answer can evokes a positive one. The game can keep track of right and wrong answers supplied by the player's character to assist in determining whether the player is ready to advance to a higher skill level. Additionally, the player can be able to see the other players in the classroom emote and react to their respective lesson so as to mirror a real-world classroom. For example, a character can ask or answer a yes or no question; ask or answer a multiple choice question; the teacher can prompt the player's character to click on the correct object relating to a question; or move an object within the environment in response to a question.

In certain embodiments, online advertising can be inserted into the game play by methods known in the art. One exemplary method is disclosed in U.S. application Ser. No. 11/299,694 by Daniel Willis et al., filed Dec. 13, 2005 and entitled "Online video game advertising system and method supporting multiplayer ads" which is incorporated herein by reference in its entirety for this and other purposes.

A number of illustrative embodiments have been described. Nevertheless, it will be understood that various modifications may be made without departing from the spirit and scope of the various embodiments presented herein. For example, trading-themed games of the type described herein can include in-game and real world trading competitions and tournaments; and the ability to observe and mirror trade other successful traders both in-game and in real world trading. Trading-themed games of the type described herein can utilize an interactive menu and map to navigate areas of the game, including the choice of activating and utilizing a real world trading interface. Trading-themed games of the type described herein can utilize a virtual currency or point system within the game, where the virtual currency or points can be earned thru successful game-play, training, learning and passing tests, or purchased with real world money. In-game virtual currency or points can be used to buy virtual goods, or advance thru levels of the video game, or to activate real world trading capabilities and trade real world markets with the video game interface. Trading-themed games of the type described herein can include mini-games designed to be fun while teaching (and testing) the player about trading and the financial markets. Trading-themed games of the type described herein can provide unique game-like trading interfaces which, in addition to functioning in the virtual game world, can also function to electronically trade financial products in the real world markets. Trading-themed games of the type described herein can provide a knowledge academy within the game for players to learn about trading via interactive videos, lectures, libraries, books, and links, as well as test their knowledge and earn virtual currency or points. Trading-themed games of the type described herein can include training grounds where players can learn from master-trader avatars and practice their trading skills and knowledge. Trading-themed games of the type described herein can include multiple levels of virtual trading pits, increasing in difficulty, intended to simulate real world electronic trading, and allow the players to further practice their trading skills and put their knowledge into action. The virtual trading pits can be surrounded by areas which sell virtual goods and services, as well as advertising space and billboards, which can also be available also to outside vendors. Trading-themed games of the type described herein can include a virtual bazaar or mall, where virtual goods and services can be bought, sold or traded by players. Storefront areas or billboards within the bazaar can also be available to outside vendors looking to advertise or buy, sell, or trade to the video game player base. Trading-themed games of the type described herein can include a unique home base space for each character within the video game, where the home base can be decorated and personalized according to player preference with free or purchasable virtual goods and decor items. Trading-themed games of the type described herein can include a global city area where all of the players' home bases are located; players can message, text and live chat between each other, in order to learn from and interact with the player community. The global city can be interleaved with areas which sell virtual goods and services, as well as advertising and billboard space which can be available for sale to third parties. Trading-themed games of the type described herein can be played with a plurality of other players, e.g., game characters, and also in a "solo" mode, where the player can play by themselves or with computer-generated characters. In a related embodiment, a player can play certain aspects of the trading-themed game off-line, e.g., not connected to the network. Examples of off-line activity can include downloading training materials as described herein to their client device so that they can study the materials without having to be connected to the game controller.

In one exemplary aspect, an electronic trading-themed video game includes a character representing a player of the video game and one or more trading levels up through which the character can work their way to gather skills, in order to move on to the next level, whereby a player can learn skills which are directly transferable to real-world trading strategies.

In one embodiment, the electronic trading-themed video game can further include a real-world trading platform. In one embodiment, the electronic trading-themed video game can further include accessing an external real-world trading platform. In one embodiment, the electronic trading-themed video game can utilize real tick data from past trading days of real-world tradable objects. In one embodiment, the electronic trading-themed video game can utilize real tick data from current trading days of real-world tradable objects. In one embodiment, the electronic trading-themed video game can further include a virtual financial-trading product. In one embodiment, the virtual financial-trading product can include a foreign-exchange market product. In one embodiment, the electronic trading-themed video game can include trading the virtual financial-trading product on a real-world trading platform. In one embodiment, the electronic trading-themed video game can further include one or more master-trader avatars that mentor the character, wherein each master-trader avatar can teach a skill. In one embodiment, the electronic trading-themed video game can further include a final trading level whereby a player is able to translate skills into the live-trading market. In one embodiment, the electronic trading-themed video game can be played on a device such as a smart phone, tablet, computer, video game console, social network, or combination thereof. In one embodiment, the electronic trading-themed video game can provide an option to be a single player game or a multi-player online game. In one embodiment, the electronic trading-themed video game can further include an introducing broker. In one embodiment, the electronic trading-themed video game can further include a front-end independent software vendor. In one embodiment, the electronic trading-themed video game further includes a brokerage. In one embodiment, the electronic trading-themed video game further includes an exchange. In one embodiment, the electronic trading-themed video game further includes generating revenue from digital downloads of the video game, retail in-store purchases, in-game advertising, upgradeable features, monthly subscriptions, virtual goods, trading commissions on real world market products traded via the video game platform, or combinations thereof.

Accordingly, other embodiments are within the scope of the following claims.

What is claimed is:

1. An electronic trading-themed video gaming system comprising: a game controller in electronic communication with a network that provides for data communication between said game controller and one or more game clients, wherein said game controller comprises logic to communicate with said one or more game clients via said network and logic to receive inputs from and send outputs to said one or more game clients for the purpose of playing an online game; wherein said online game is a finance-based, trading-themed training environment game having a player interface where, as part of playing said game, wherein a player may selectively participate in a virtual trading marketplace trading virtual real-world objects within said virtual world; wherein said online game further comprises at least a first playing level having at least a first degree of difficulty, wherein said player may advance through a variety of levels of difficulty based upon a predetermined threshold, wherein in the event that the player reaches a redetermined level within the game, said player is allowed access to trading objects that exist in both the virtual world and the real-world; and wherein each of the plurality of playing levels is displayed on a display device of said one or more game clients as different virtual trading and training environments.

2. The electronic trading-themed video gaming system of claim 1, wherein said game controller is configured to receive game-play input from a first game client, executing functions to advance game play specific to said first game client according to game logic, and publishing game content to said first game client.

3. The electronic trading-themed video gaming system of claim 1, wherein said virtual world within said online game provides an opportunity for the player to participate in one or more educational experiences that teach said player selected financial aspects or how to use said player interface to trade one or more of said trading objects, or both.

4. The electronic trading-themed video gaming system of claim 3, wherein said trading object is a product listed on a public or private exchange.

5. The electronic trading-themed video gaming system of claim 4, wherein said trading object is a stock, bond, commodity, index, future, option, derivative, micro-product, hedge- or exchange-traded fund or mutual fund.

6. The electronic trading-themed video gaming system of claim 1, wherein said criterion comprises successfully completing at least one of said educational experiences.

7. The electronic trading-themed video gaming system of claim 1, wherein said criterion comprises accruing a selected threshold number of points earned through profitable trades of said trading objects within said virtual trading marketplace or accomplishing learning objectives defined in game logic.

8. The electronic trading-themed video gaming system of claim 1, further comprising logic for communicating a market trade defined by said player to a brokerage from said interface, receiving a communication from said brokerage in response to executing said market trade, and integrating a result of said market trade into game-play of said game.

9. The electronic trading-themed video gaming system of claim 1, wherein said game controller is configured to receive market data from one or more market data providers.

10. The electronic trading-themed video gaming system of claim 9, wherein said game controller is configured for using live market data for game play or storing market data for use in simulated virtual trading sessions.

11. The electronic trading-themed video gaming system of claim 1, further comprising logic for publishing trading activity of a first game client to a second game client, wherein said trading activity is trading activity on said virtual marketplace.

12. The electronic trading-themed video gaming system of claim 1, wherein said game client is a personal computer, laptop computer, smartphone, tablet, cellular phone, gaming device or console, or module of an electronic social media platform.

13. A computer-implemented game, comprising: a game environment provided by a virtual world controlled by computer logic comprising: one or more player-controllable characters; a training environment within said virtual world where each character can achieve credit for acquiring financial trading skills taught within said training environment; and a plurality of ordered playing levels in which a selected character is engendered by a player to perform a trading activity in a virtual marketplace, wherein each of said playing levels has a different degree of difficulty related to profit-making from said trading activity, and wherein said character must meet criteria to move from a first playing level to a second playing level, and wherein the degree of difficulty of each playing level is related to a pre-determined threshold for a profit made from the trading activity; wherein upon fulfilling a condition, said character is provided access to a real-world market through said game environment, thereby allowing said player to execute real-world marketplace trading activity from within said game environment.

14. The computer-implemented game of claim 13, wherein said one or more player-controllable characters compete with each other in virtual-world or real-world trading competitions or tournaments.

15. The computer-implemented game of claim 13, wherein said training environment is a virtual classroom or virtual space where a game character having knowledge of trading markets mentors the one or more player-controllable characters.

16. The computer-implemented game of claim 13, wherein said playing levels are represented by different virtual trading pits comprising the one or more player-controllable characters, including characters controlled by other players engaged in said game.

17. The computer-implemented game of claim 13, wherein a first character of said one or more player-controllable characters is configured to receive market-related information from a repository of market data or a second character of said one or more characters.

18. The computer-implemented game of claim 13, wherein the condition is fulfilled upon completing a highest playing level of the game environment.

19. The computer-implemented game of claim 13, wherein the condition is fulfilled upon receiving payment of a fee.

20. A system for generating revenue, wherein said training environment comprising: a live-hosted multiplayer online gaming system comprising: a game controller in electronic communication with a network that provides for data communication between said game controller and a plurality of game clients, wherein said game controller comprises logic to communicate with one or more of said plurality of game clients via said network and logic to receive inputs from and send outputs to said one or more game clients for the purpose of playing an online game; wherein said online game is a finance-based, trading-themed game having a player interface where, as part of playing said game, a player can selectively trade virtual trading objects in a virtual marketplace within said virtual world.

* * * * *